(12) United States Patent
Oberhofer et al.

(10) Patent No.: US 11,941,056 B2
(45) Date of Patent: Mar. 26, 2024

(54) METHOD FOR WEIGHTING A GRAPH

(71) Applicant: International Business Machines Corporation, Armonk, NY (US)

(72) Inventors: Martin Oberhofer, Sindelfingen (DE); Mike W. Grasselt, Leinfelden-Echterdingen (DE); Claudio Andrea Fanconi, Celerina (CH); Thuany Karoline Stuart, Nice (FR); Yannick Saillet, Stuttgart (DE); Basem Elasioty, Regensburg (DE); Hemanth Kumar Babu, Böblingen (DE); Robert Kern, Karlsruhe (DE)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 17/234,835

(22) Filed: Apr. 20, 2021

(65) Prior Publication Data
US 2021/0342397 A1 Nov. 4, 2021

(30) Foreign Application Priority Data
Apr. 29, 2020 (EP) .................................. 20171979

(51) Int. Cl.
*G06F 16/901* (2019.01)
*G06F 16/36* (2019.01)

(52) U.S. Cl.
CPC ........ *G06F 16/9024* (2019.01); *G06F 16/367* (2019.01)

(58) Field of Classification Search
None
See application file for complete search history.

(56) References Cited

U.S. PATENT DOCUMENTS

| 7,062,493 | B1 | 6/2006 | Babka |
| 10,642,891 | B2 | 5/2020 | Choe |
| 10,885,452 | B1* | 1/2021 | Garg ........................ G06N 7/01 |

(Continued)

FOREIGN PATENT DOCUMENTS

| CN | 107133257 A | 9/2017 |
| CN | 108985588 A | 12/2018 |

(Continued)

OTHER PUBLICATIONS

Bleiholder et al., "Data Fusion", ACM Computing Surveys, vol. 41, No. 1, Article 1, Publication date: Dec. 2008, 41 pages, <http://doi.acm.org/10.1145/1456650.1456651>.

(Continued)

*Primary Examiner* — Grace Park
(74) *Attorney, Agent, or Firm* — Brian M. Restauro

(57) ABSTRACT

The present disclosure relates to a method for a weighting graph comprising nodes representing entities and edges representing relationships between entities in accordance with one or more domains. The method comprises: preprocessing the graph comprising assigning weights to the nodes and/or the edges of the graph in accordance with a specific domain of the domains, wherein the weight indicates a domain specific data quality problem of attribute values representing an edge of the edges and/or an entity involved in that edge. The weighted graph may be provided for enabling a processing of the graph in accordance with the specific domain.

12 Claims, 5 Drawing Sheets

(56) References Cited

U.S. PATENT DOCUMENTS

| | | | |
|---|---|---|---|
| 10,978,056 B1* | 4/2021 | Challa | G06N 5/025 |
| 11,500,876 B2 | 11/2022 | Stuart | |
| 11,531,656 B1 | 12/2022 | Bremer | |
| 2009/0262664 A1 | 10/2009 | Leighton | |
| 2010/0063973 A1 | 3/2010 | Cao | |
| 2013/0257874 A1 | 10/2013 | Saund | |
| 2014/0075004 A1* | 3/2014 | Van Dusen | H04L 41/04 |
| | | | 709/223 |
| 2014/0149465 A1 | 5/2014 | Kannan | |
| 2014/0280224 A1 | 9/2014 | Feinberg | |
| 2014/0324864 A1 | 10/2014 | Choe | |
| 2015/0012509 A1* | 1/2015 | Kirn | G06F 16/24556 |
| | | | 707/700 |
| 2015/0039611 A1 | 2/2015 | Deshpande | |
| 2015/0088841 A1 | 3/2015 | Fuglsang | |
| 2017/0262868 A1* | 9/2017 | Manjunath | G06Q 30/016 |
| 2017/0316175 A1* | 11/2017 | Hu | G06N 5/022 |
| 2017/0337268 A1 | 11/2017 | Ait-Mokhtar | |
| 2018/0075359 A1* | 3/2018 | Brennan | G06N 5/022 |
| 2018/0189564 A1 | 7/2018 | Freitag | |
| 2018/0373932 A1 | 12/2018 | Albrecht | |
| 2019/0205479 A1 | 7/2019 | Zizka | |
| 2019/0228224 A1 | 7/2019 | Guo | |
| 2020/0104362 A1* | 4/2020 | Yang | G06N 5/048 |
| 2020/0257731 A1 | 8/2020 | Srinivas | |

FOREIGN PATENT DOCUMENTS

| | | |
|---|---|---|
| CN | 115455046 A | 12/2022 |
| WO | 2017213537 A1 | 12/2017 |
| WO | 2019220128 A1 | 11/2019 |

OTHER PUBLICATIONS

Chawla et al., "Smote: Synthetic Minority Over-sampling Technique", Journal of Artificial Intelligence Research 16 (2002) 321-357, Submitted Sep. 2001; published Jun. 2002, 37 pages.

Christen, Peter, "A Survey of Indexing Techniques for Scalable Record Linkage and Deduplication", IEEE Transactions On Knowledge and Data Engineering, 2011, 20 pages.

Oberhofer et al., "Method for Weighting a Graph", Application No. EP20171979.6, Filed Apr. 29, 2020, 21 pages.

Stuart et al., "Method for Duplicate Determination in a Graph", Application No. EP20171981.2, Filed Apr. 29, 2020, 29 pages.

Stuart et al., "Method for Duplicate Determination in a Graph", U.S. Appl. No. 17/114,547, filed Dec. 8, 2020, 33 pages.

Appendix P—List of IBM Patents or Patent Applications Treated as Related, Filed herewith, 2 Pages.

"Match comparisons", IBM Documentation, Release date: Dec. 14, 2012, 5 pages, <https://www.IBM.com/support/knowledgecenter/SSZJPZ_9.1.0/com.ibm.swg.im.iis.ds.design.help.doc/topics/c_qresfgde_Match_comparisons.html>.

"Probabilistic vs. deterministic matching styles", IBM Documentation, Last updated: Mar. 24, 2021, 3 pages, <https://www.ibm.com/docs/en/imdm/11.6?topic=data-probabilistic-vs-deterministic-matching-styles>.

Krleza et al., "Graph Matching using Hierarchical Fuzzy Graph Neural Networks", IEEE Transactions On Fuzzy Systems, vol. X, No. Y, Aug. 2016, 13 pages.

Bremer et al. "Duplicate Determination in a Graph", U.S. Appl. No. 17/341,430, filed Jun. 8, 2021, 31 pages.

Chen, Alan Chia-Lung, et al. "Approximating the maximum common subgraph isomorphism problem with a weighted graph." Abstract Only, Knowledge-Based Systems 85 (2015): 265-276. (Year: 2015).

Dasan, Sakhti. "Distance Measures—What is Similarity, Dissimilarity and Correlation." Published Aug. 26, 2014. Retrieved Mar. 24, 2022 from https://blog.shakthydoss.com/2014/08/distance-measures-what-is-similarity.html (Year: 2014).

Gross, Geoff. Graph Analytic Techniques In Uncertain Environments: Graph Matching and Link Analysis. Doctoral dissertation, University at Buffalo, State University of New York. Published May 7, 2013. ProQuest Dissertations Publishing. (Year: 2013).

* cited by examiner

US 11,941,056 B2

METHOD FOR WEIGHTING A GRAPH

BACKGROUND

The present invention relates to the field of digital computer systems, and more specifically, to a method for weighting a graph.

A database system may, for example, use graph structures for semantic queries with nodes, edges, and properties to represent and store data. The graph relates the data items in the store to a collection of nodes and edges, the edges representing the relationships between the nodes. The relationships allow data in the store to be linked together directly and, in many cases, retrieved with one operation.

SUMMARY

Various embodiments provide a method for weighting a graph, computer system and computer program product as described by the subject matter of the independent claims. Advantageous embodiments are described in the dependent claims. Embodiments of the present invention can be freely combined with each other if they are not mutually exclusive.

In one aspect, the invention relates to a computer implemented method for weighting a graph comprising nodes representing entities and edges representing relationships between entities in accordance with one or more domains. The method comprises: pre-processing the graph comprising assigning weights to the nodes and/or the edges of the graph in accordance with a specific domain of the domains, the weight indicating a domain specific data quality problem of one or more attribute values representing (or assigned to) an edge of the edges and/or a node connected to that edge, the pre-processing resulting in a weighted graph, providing the weighted graph for enabling a processing of the graph in accordance with the specific domain.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a computer system for a graph comprising nodes representing entities and edges representing relationships between entities in accordance with one or more domains. The computer system is configured for: pre-processing the graph comprising assigning weights to the nodes and/or the edges of the graph in accordance with a specific domain of the domains, the weight indicating a domain specific data quality problem of attribute values representing an edge of the edges and/or a node connected to that edge, providing the weighted graph for enabling a processing of the graph in accordance with the specific domain.

BRIEF DESCRIPTION OF THE DRAWINGS

In the following embodiments of the invention are explained in greater detail, by way of example only, making reference to the drawings in which.

DETAILED DESCRIPTION

Figure 1A:
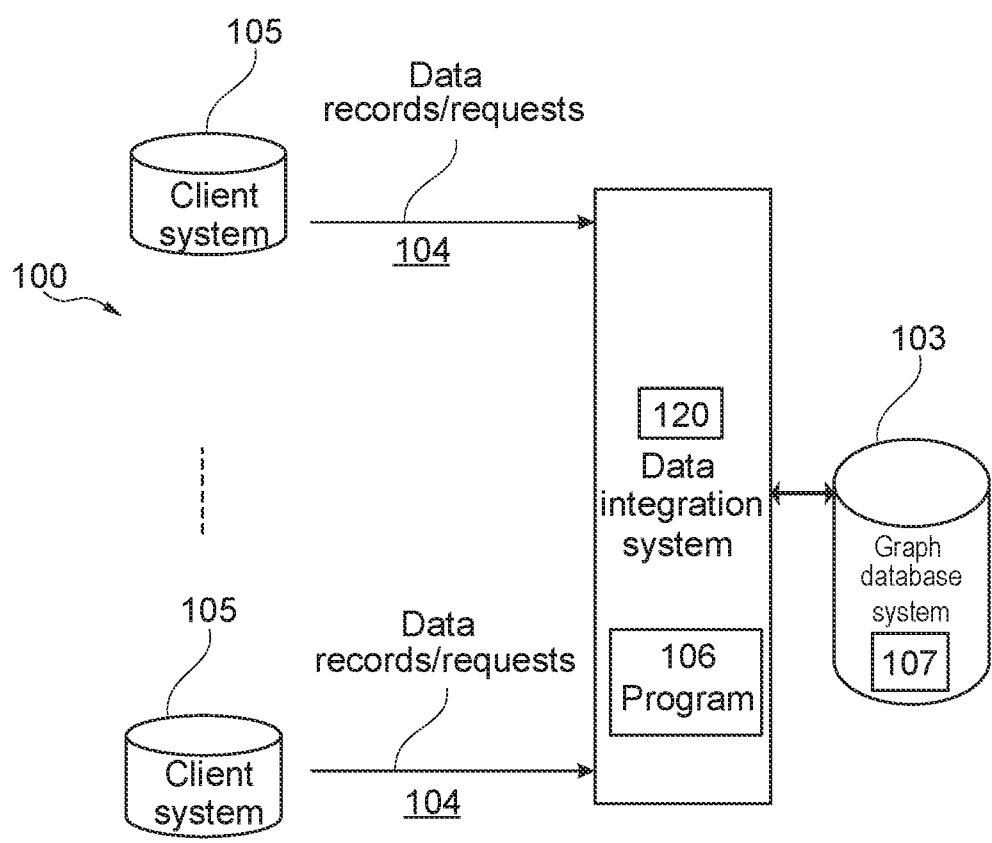
FIG. 1A is a diagram of a computer system in a accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A graph refers to a property graph where data values are stored as properties on nodes and edges. Property graphs may be managed and processed by a graph database management system or other database systems which provide a wrapper layer converting the property graph to, for example, relational tables for storage and convert relational tables back to property graphs when read or queried. The graph may, for example, be a directed graph. The graph may be a collection of nodes (also called as vertices) and edges. The edge of the graph connects any two nodes of the graph. The edge may be represented by an ordered pair (v1, v2) of nodes and that can be traversed from node v1 toward node v2. A node of the graph may represent an entity. The entity refers to a user, object etc. The entity (and the corresponding node) may have certain one or more entity attributes or properties which may be assigned values. For example, a person may be an entity. The entity attributes of the person may, for example, comprise a marital status, age, gender etc. The attribute values that represent the node are values of the entity attributes of the entity represented by the node. The edge may be assigned one or more edge attribute values indicative of at least a relationship between the two nodes connected to the edge. The attribute values that represent the edge are values of the edge attributes. The relationship may, for example, comprise an inheritance (e.g., parent and child) relationship and/or associative relationship in accordance with a certain hierarchy. For example, the inheritance relationship between nodes v1 and v2 may be referred to as a "is-a relationship" between v1 and v2 e.g., "v2 is-a parent of v1". The associative relationship between nodes v1 and v2 may be referred to as a "has-a relationship" between v1 and v2 e.g., "v2 has a has-a relationship with v1" means that v1 is part or is a composition of or associated with v2.

The graph may represent entities and relationships of a set of one or more domains. A domain (also referred to as domain ontology) represents concepts or categories which belong to a part of the world, such as biology or politics. The domain typically models domain-specific definitions of terms. For example, a domain can refer to a healthcare, advertising, commerce, medical and/or biomedical-specific field. The set of one or more domains may represent an ontology. For example, the set of domains may comprise a family domain and company domain, wherein the family domain and company domain belong to a same ontology which may be an employee ontology.

Processing the graphs may however technically be challenging because the graphs have usually millions of nodes and edges such as a graph that stores data of millions of customer records, contracts, etc. as well as person records related to companies with hundreds of thousands of employees. This may be particularly challenging in case of data deduplication or data communication over a network or any other processing of the graphs. For example, a master data management (MDM) system uses graphs as persistency storage to identify duplicate records and needs to resolve them if applicable. This process is a matching process and uses deterministic and/or probabilistic matching techniques with fuzzy operators such as phonetics (Soundex, NYSIIS, . . . ), edit distance, nick name resolution, etc.

In addition, the data of the graph may have a set of data quality problems. The data quality problem may depend on the domain of the set of domains represented by the graph. For example, the set of data quality problems may comprise a subset of data quality problems of a family domain and another subset of data quality problems of another domain etc. Each data quality problem of the set of data quality problems may, for example, be determined for a given entity attribute and/or corresponding edge attribute by determining if the values of the entity attribute and/or edge attribute fulfil an expectation of what should be a valid value of the entity attribute and/or edge attribute respectively. For example, the determining that the values of the entity attribute and/or edge attribute fulfil the expectation comprises comparing the values of the entity attribute and/or edge attribute with reference values respectively. For example, an edge v1-v2 connecting two nodes v1 and v2 may be associated or may have at least two pairs of attributes ($att_{v1}$, $att_{v1-v2}$) and ($att_{v1}$, $att_{v2-v1}$), where $att_{v1}$ is an entity attribute of the node v1, $att_{v1-v2}$ is an edge attribute of the edge v1-v2 indicating the relation between nodes v1 and v2 and $att_{v2}$ is an entity attribute of the node v2. The weight of the edge v1-v2 and/or of the node v1 and/or of the node v2 may be computed based on a determination whether at least one of the individual attributes $att_{v1}$, $att_{v1-v2}$ and $att_{v2}$ has a domain specific data quality problem and/or at least one of the two pairs ($att_{v1}$, $att_{v1-v2}$) and ($att_{v1}$, $att_{v2-v1}$) has a domain specific data quality problem. The determining that the pair ($att_{v1}$, $att_{v1-v2}$) or ($att_{v1}$, $att_{v2-v1}$) has the domain specific data quality problem may be performed by comparing the combination of the attributes of the pair with predefined reference relationships.

To solve the above issues, the present subject matter provides weighted graphs having additional information, namely weights indicative of data quality issues. This may provide an enriched dataset, compared to unweighted graphs, and thus enables an efficient processing of the graph. The processing is efficient because the weights are computed at once and provided with the graph so that individual weights determinations may be prevented. This may also enable a centralized and consistent data production.

The weights may indicate which edges and/or nodes should be ignored for processing the graph. In one example, the values of the weights may be determined based on the type of processing to be performed. For example, the processing of the graph may comprise computing a mapping for a subgraph similarity between subgraphs of the graph. In this case, the weights may be provided so as to reduce the impact of poor data quality on match results e.g. the weight of edges/nodes involved in a conflict may be lowered so that they have less impact on mapping results.

For example, a method for weighting a graph is provided. The graph comprises nodes representing entities and edges representing relationships between entities in accordance with one or more domains. The method comprises: preprocessing the graph comprising assigning weights to the nodes and/or the edges of the graph in accordance with a specific domain of the domains. The weight of a node of the graph indicates a domain specific data quality problem of one or more attribute values of the node and/or of one or more attribute values of the edge to which the node is connected. The weight of an edge of the graph indicates a domain specific data quality problem of one or more attribute values of the edge and/or of one or more attribute values of the node connected to the edge. The weighted graph may be provided for enabling a processing of the graph in accordance with the specific domain.

According to one embodiment, the method further comprises performing the pre-processing of another graph resulting in another weighted graph and matching the two weighted graphs using the weights.

For example, a support for a fuzzy graph matching may be added by using rules on the weights to ignore or minimize the impact of low quality data. This embodiment may improve the data matching in cases where at least one of the compared graphs has data quality issues.

For example, in case of a risk life insurance, a contract may have two relationships: a contract owner relationship to a person and a beneficiary relationship to a person. An ontology rule may require that these two relationships are not permitted to point to the same node representing a person. In cases where this is found in a graph, this may be a data quality error and the corresponding edges may be ignored when finding the mapping of subgraphs.

According to one embodiment, the assigning of the weights comprises: using semantic rules of the specific domain for determining a consistency level between attribute values of a node and attribute values of an edge connected to the node, and assigning the weights based on the consistency level. For example, if an entity attribute of a node representing a person is a marital status with a value of single and if that node has an edge of type spouse of to another node—there is an inconsistency and thus a data quality problem because a single cannot have a spouse relation at the same time. This means for the mapping between graphs, the spouse-of relationship may be ignored or get a low contribution to the comparison result.

According to one embodiment, the assigning of the weights comprises: determining a set of ontology rules descriptive of an ontology of the specific domain, and determining whether the attribute values of the nodes and/or edges fulfil the set of ontology rules, and assigning the weights based on the determining step.

According to one embodiment, the set of ontology rules are automatically determined and/or user defined. A user defined ontology rule may, for example, be defined as follows: If Node.domain not in [1,2,3 . . . ] then remove Node or If Node.married=False then remove Node.spouse. Removing a node or edge may comprise assigning a very low weight to the node or edge respectively. An automatically derived ontology rule may, for example, be defined as follows: If node.[edge] to NodeX then increase weight for node.edge.

That is, the weight of an edge increases if it points to a certain node.

According to one embodiment, the set of ontology rules are derived from a given sample dataset representing the specific domain, based on determining common or uncommon edges to nodes of another domain, wherein the uncommon edges are assigned higher weights. For example, the ontology rules are derived from a given group of the sample dataset based on determining common or uncommon edges to nodes external to the nodes of said group and the method includes increasing the weight of rare edges. This may be advantageous because rare edges might indicate a high similarity when comparing nodes.

According to one embodiment, the method further comprises removing nodes and/or edges having weights that fulfil a predefined filtering condition, and providing the resulting graph. The filtering condition or rule may, for example, require weights of the nodes and/or edges to be higher than a predefined threshold. The filtering condition may, for example, be dependent on the type of processing to be performed. For example, if the type of processing is to send data over a network with limited bandwidth, the filtering condition may use a higher threshold value compared to the processing type requiring a storage of the graph. This may enable an optimal use of the graphs with different types of processing without having to pre-process them for each type of processing.

According to one embodiment, the weights indicate a reliability of the nodes and optionally edges for being used as a basis for a matching decision by a matching program. This may enable an efficient mapping of graphs.

According to one embodiment, the method further comprises receiving a request from a database matching engine. The request indicates the specific domain. In response to receiving the request, the pre-processing may be performed, wherein the weighted graph is provided to the database matching engine. This may enable a seamless integration of the present subject matter with existing systems. The present subject matter may enable a centralized pre-processing of the graphs. For example, requests of multiple matching engines may be received and processed by the computer system in accordance with the present subject matter.

According to one embodiment, the weighted graph may be processed in accordance with one or more types of processing. For example, the graph may be stored based on the weights e.g. nodes and/or edges having certain weights may not be stored. In another example, a data analysis may be performed on the graph based on the weights e.g. a first user may consider only nodes and/or edges having certain weights while a second user may consider only nodes and/or edges having other weights.

FIG. 1A depicts an exemplary computer system 100. The computer system 100 may, for example, be configured to perform master data management and/or data warehousing e.g. the computer system 100 may enable a de-duplication system. The computer system 100 comprises a data integration system 101 and one or more client systems or data sources 105. The client system 105 may comprise a computer system (e.g. as described with reference to FIG. 6). The data integration system 101 may control access (read and write accesses etc.) to a graph database system 103.

The client systems 105 may communicate with the data integration system 101 via a network connection which comprises, for example, a wireless local area network (WLAN) connection, WAN (Wide Area Network) connection LAN (Local Area Network) connection or a combination thereof.

The client system 105 may be configured to receive or generate a query request. For example, the client system 105 generates or receives a query request at the graph database system 103. The query request may, for example, request the identification of duplicate nodes. The client system 105 sends or forwards the query request to the data integration system 101. The data integration system 101 may be configured to fetch data using the graph database system 103 to compute the appropriate subsets of a graph 107 of the graph database system 103 to be sent back to the client system 105 in response to the query request.

In another example, each client system 105 may be configured to send data records (e.g., data records/requests 104) to the data integration system 101 in order to be stored by the graph database system 103. A data record or record may be a collection of related data items such as a name, date of birth and class of a particular entity. A record represents an entity, wherein an entity refers to a user, object, or concept about which information is stored in the record. The terms "data record" and "record" are interchangeably used. The graph database system 103 may use a graph 107 in order to store the records as entities with relationships, where each record may be assigned to a node or vertex of the graph 107 with properties being attribute values such as name, date of birth etc. The data integration system 101 may store the records received from client systems 105 using the graph database system 103 and checks for duplicate nodes in the graph 107. For example, the client systems 105 may be configured to provide or create data records which may or may not have the same structure as the graph 107. For example, a client system 105 may be configured to provide records in XML or JSON format or other formats that enable to associate attributes and corresponding attribute values.

In one example, the data integration system 101 may import data records from a client system 105 using one or more Extract-Transform-Load (ETL) batch processes or via HyperText Transport Protocol ("HTTP") communication or via other types of data exchange. The data integration system 101 and/or client systems 105 may be associated with, for example, Personal Computers (PC), servers, and/or mobile devices.

The data integration system 101 may be configured to process the received records using one or more algorithms (i.e., programs) such as program 106 implementing at least part of the present method. For example, the data integration system 101 may process data records of the graph 107 using the algorithm 120 in order to find pairs of records that represent the same entity or duplicate records in accordance with the present disclosure. Although shown as separate components, the graph database system 103 may be part of the data integration system 101 in another example.

Figure 1B:
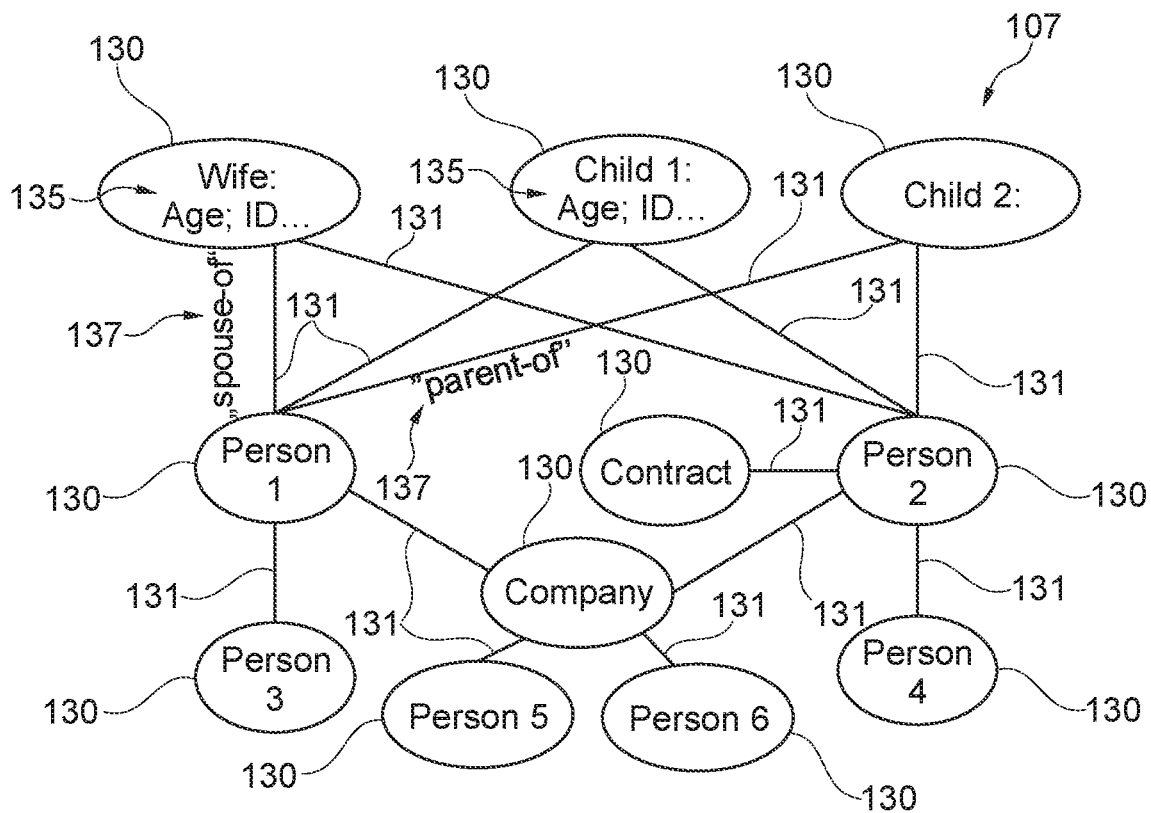
FIG. 1B is a diagram of a simplified structure of a graph in accordance with an example of the present subject matter.

FIG. 1B is a diagram of a simplified structure of the graph 107 in accordance with an example domain ontology. The example ontology concerns employees of a company. The graph 107 has a plurality of nodes 130 which represent employees of the company. Each of the nodes 130 may comprise attribute values of entity attributes of a respective record. For example, a node 130 representing a wife has attribute values of entity attributes 135 such as age, ID etc. The nodes 130 are linked together by a plurality of edges 131. The edge 131 is associated with edge attribute values 137 indicative of the relations between respective nodes. For example, the edge 131 linking the node person1 and the node wife is associated with an edge attribute value "spouse-of" indicating that that the person represented by the node person1 is a spouse of the person represented by the node wife. By traversing the graph 107, the data integration system 101 can find out which respective nodes are related to other nodes.

The graphs are represented in the present drawings as follows. The nodes of a graph are represented by circles/ellipses in the drawings and the edges are represented by lines connecting two nodes of the graph. Entities such as wife, Person1 etc. which are represented by the nodes are written inside the circles. For simplification of the drawings and the description, only part of the nodes and edges are shown with part of their associated entity and edge attributes. However, each node and each edge of a graph may be associated with one or more entity attributes and one more edge attributes respectively.

Figure 2:
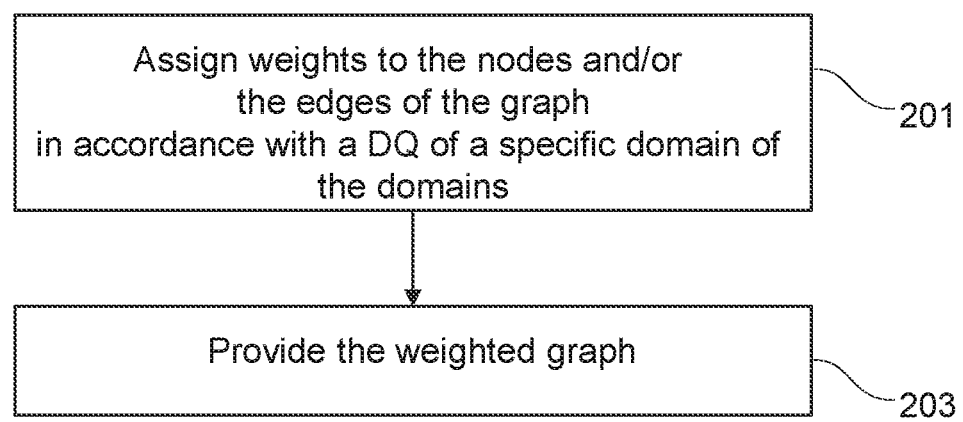
FIG. 2 is a flowchart of a method for providing a graph in accordance with an example of the present subject matter.

FIG. 2 is a flowchart of a method for weighting a graph, e.g. 107, in accordance with an example of the present subject matter. For the purpose of explanation, the method may be implemented in the computer system 100 illustrated in previous FIGS. 1A-B, but is not limited to this implementation. The method of FIG. 2 may, for example, be performed by the data integration system 101.

The graph 107 may be pre-processed in step 201. The pre-processing may, for example, comprise assigning weights to the nodes and/or the edges of the graph 107 in accordance with a specific domain of the set of domains that are represented by the graph 107. The weight of each node v1 of the graph 107 and/or an edge v1-v2 connected to said node v1 of the graph 107 may be determined based on determining whether the values of the entity attributes 135 of the node v1 and/or the values of the edge attributes 137 of the edge v1-v2 have a domain specific data quality problem of the set of data quality problems. The domain specific data quality problem may be a data quality problem for the specific domain. In one example, if the values of one or more of the edge attributes 137 have a data quality problem of the specific domain, then a weight may be assigned to the edge v1-v2, and optionally a weight may be assigned to the node v1 and/or v2. In one example, if the values of one or more of the entity attributes 135 of node v1 have a data quality problem of the specific domain, then a weight may be assigned to the node v1, and optionally a weight may be assigned to the edge v1-v2 or to other edges connected to the node v1. The weight may have a value indicative of the relevance of the domain specific data quality problem. For example, if an entity attribute age is 35 for a node representing a grandfather, the weight assigned to the node may, for example, be inversely proportional to the difference between the value 35 and a reference value (average age of grandfathers), if 35 is smaller than the reference value.

For example, the node v1 represents a person, and the entity attribute of the node v1 may comprise a marital status with a value single. The edge attribute of the edge v1-v2 may be a family relationship with a value spouse of. In this case, there is a data quality problem because a single cannot have a spouse relation at the same time. The weight may be assigned for the node v1 and/or edge v1-v2 so that the spouse-of relationship may be ignored when processing the weighted graph.

In one example, the pre-processing of the graph 107 may be performed in response to receiving a request by the data integration system e.g. from a client system 105. This may enable an on-demand and controlled processing the graph 107. In another example, the pre-processing of the graph 107 may automatically be performed e.g. in response to changing or storing the graph 107.

The weighted graph may be provided in step 203. This may enable a processing of the graph in accordance with the specific domain e.g. as described with reference to FIG. 3. For example, the weighted graph may be stored using the weights e.g. edges or nodes with certain weights may not be stored.

Figure 3:
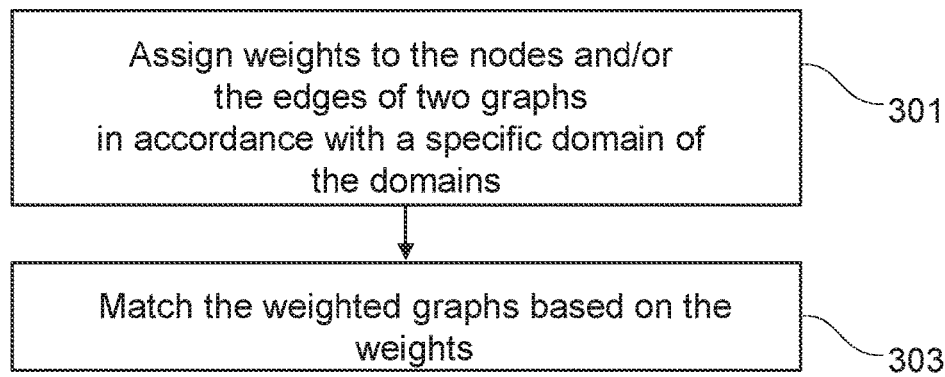
FIG. 3 is a flowchart of a method for mapping graphs in accordance with an example of the present subject matter.

FIG. 3 is a flowchart of a method for mapping two graphs in accordance with an example of the present subject matter. For the purpose of explanation, the method may be implemented in the computer system 100 illustrated in previous FIGS. 1A-B, but is not limited to this implementation. The method of FIG. 3 may, for example, be performed by the data integration system 101.

Two graphs may be preprocessed in step 301. The preprocessing of each of the two graphs may be performed as described with reference to step 201 of FIG. 2. This may result in two weighted graphs. In one example, the two graphs may be subgraphs of a larger graph e.g. 107. This may enable to perform duplicate searching in the graph 107. In another example, the two graphs may be independent graphs.

The two weighted graphs may be compared or matched in step 303. The comparison may be performed using the weights. In one example, the nodes and edges having a weight smaller than a threshold may be excluded so that the comparison between the two graphs may be performed without the excluded nodes and edges. This may enable an accurate matching that takes into account data quality issues.

Figure 4:
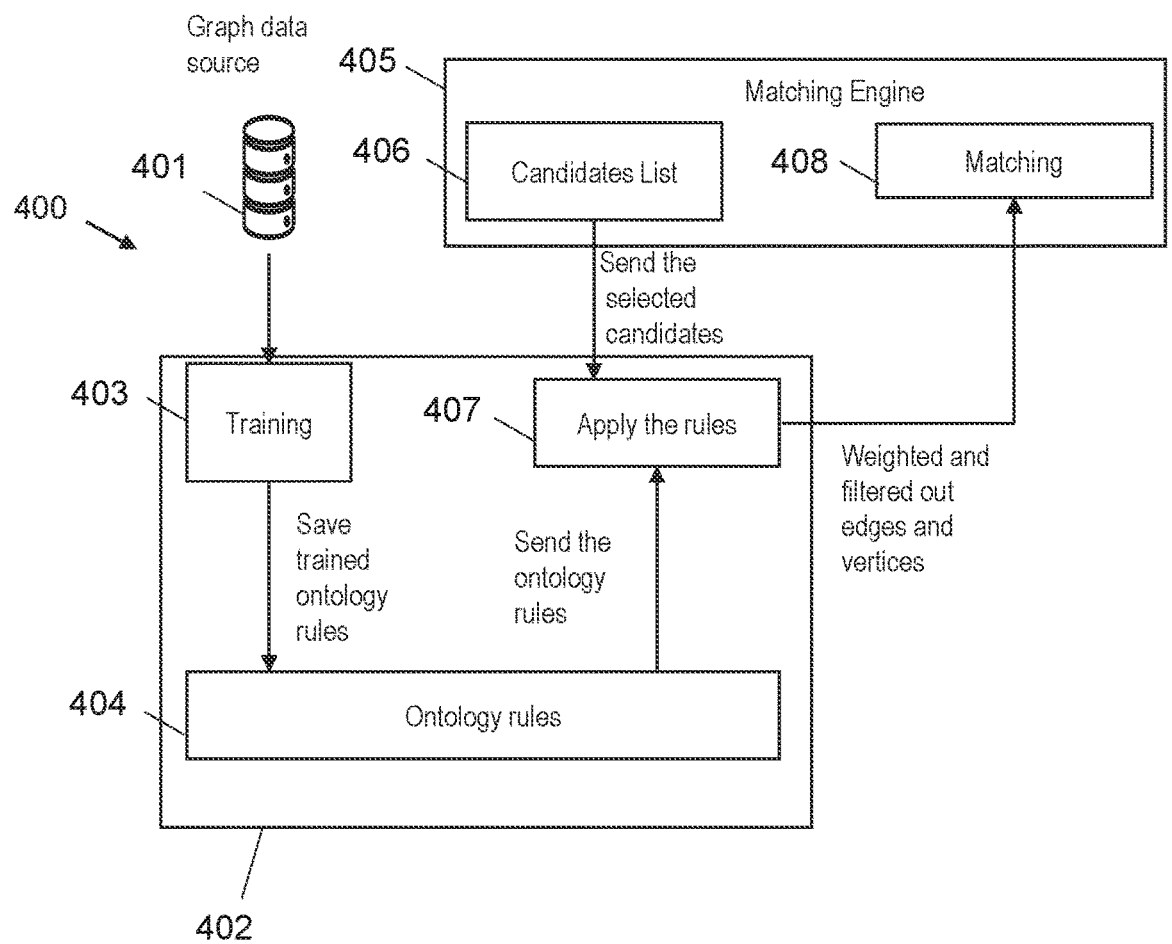
FIG. 4 is a diagram of a computer system in a accordance with an example of the present subject matter.

FIG. 4 depicts a diagram of a computer system 400 in accordance with an example of the present subject matter.

A graph data source 401 may provide training data 403 to an ontology system 402. The training data 403 may, for example, comprise one or more graphs, wherein the graphs represent different ontology models. The ontology system 402 may, for example, be configured to generate ontology rules 404 from the training data 403. The ontology rules 404 may, for example, automatically be generated using an association rule mining/learning method. The ontology rules 404 may be saved in the ontology system 402. The ontology system 402 may be configured to receive from a matching engine 405 a candidate list 406 of graphs or subgraphs. The ontology system 402 may apply (407) the ontology rules on the received graphs. The weighted graphs may, for example, be filtered in accordance with one or more filtering rules as described herein. The resulting weighted and/or filtered graphs are sent by the ontology system 402 to the matching engine 405 in order to perform the matching (408) of the received graphs.

Figure 5A:
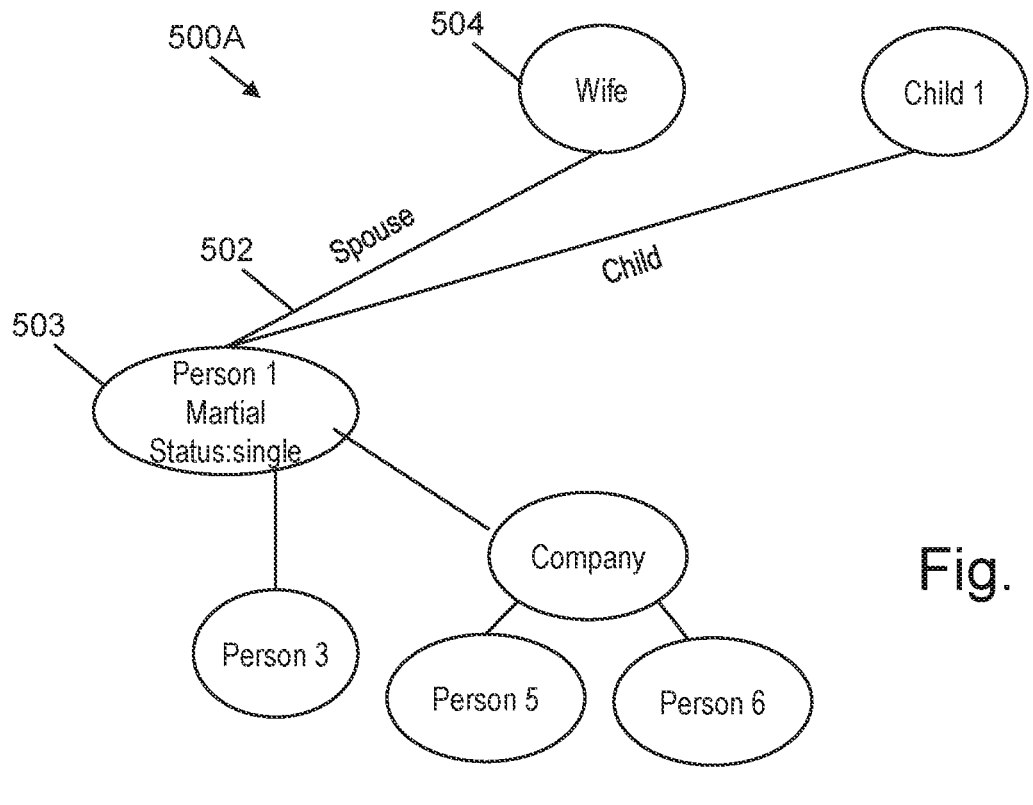
FIG. 5A depicts a graph in accordance with an example of the present subject matter.
Figure 5B:
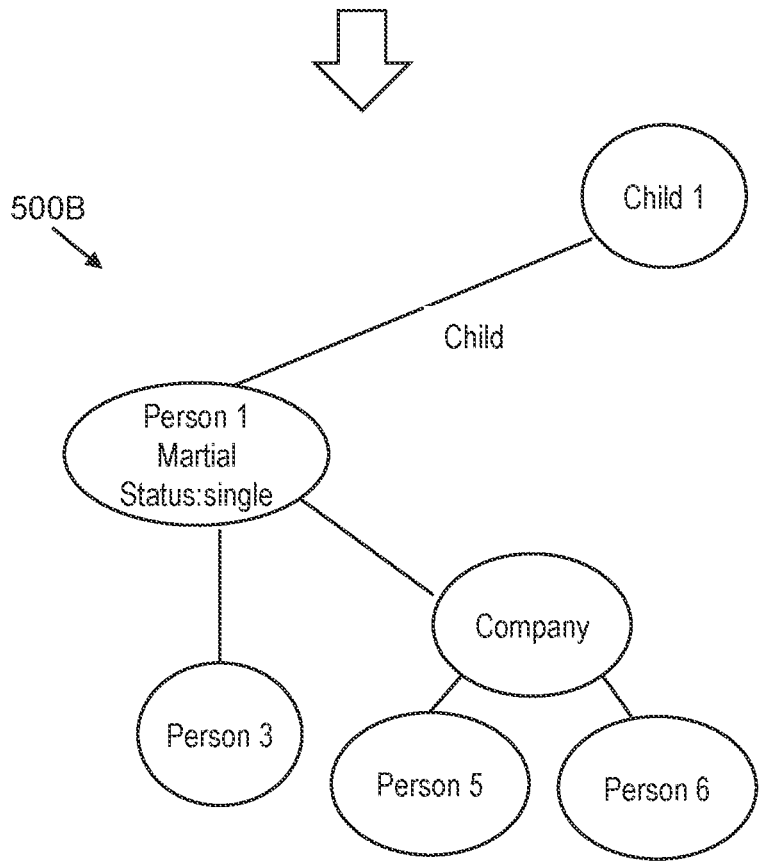
FIG. 5B depicts a weighted graph in accordance with an example of the present subject matter.

FIGS. 5A and 5B illustrate a method of processing a weighted graph in accordance with an example of the present subject matter. The graph 500A of FIG. 5A may have a lower weight for the edge 502 that links a node 503 representing a person to a node 504 representing a wife. The processing of the graph 500A may for, example, comprise removing the edge 502 and the node 504. This may result in a graph 500B with optimal data quality.

Figure 6:
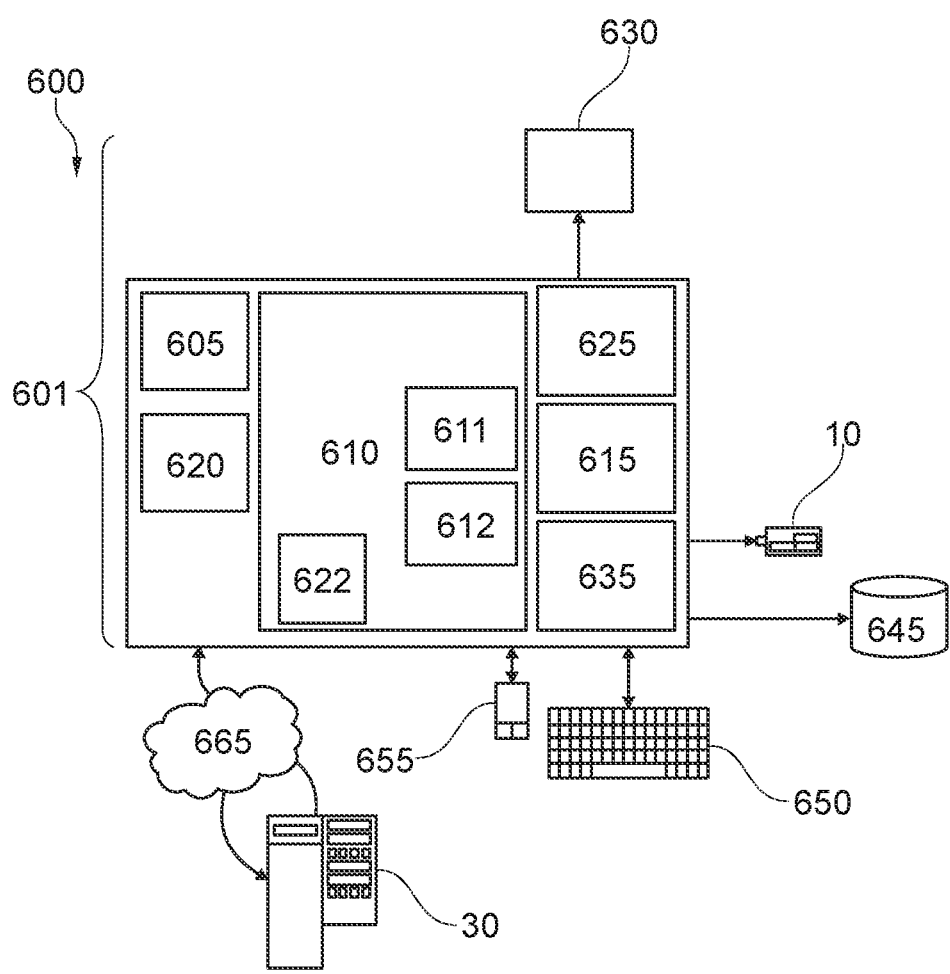
FIG. 6 represents a computerized system, suited for implementing one or more method steps as involved in the present subject matter.

FIG. 6 represents a general computerized system 600 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 612, 622 (including firmware 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 600 therefore includes a general-purpose computer 601.

In exemplary embodiments, in terms of hardware architecture, as shown in FIG. 6, the computer 601 includes a processor 605, memory (main memory) 610 coupled to a memory controller 615, and one or more input and/or output (I/O) devices (or peripherals) 10, 645 that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor-based microprocessor (in the form of a microchip or chip set), or generally any device for executing software instructions.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 may include one or more separate programs, each of which comprises an ordered listing of executable instructions for implementing logical functions, notably functions involved in embodiments of this invention. In the example of FIG. 6, software in the memory 610 includes instructions 612 e.g. instructions to manage databases such as a database management system.

The software in memory 610 shall also typically include a suitable operating system (OS) 411. The OS 611 essentially controls the execution of other computer programs, such as possibly software 612 for implementing methods as described herein.

The methods described herein may be in the form of a source program 612, executable program 612 (object code), script, or any other entity comprising a set of instructions 612 to be performed. When a source program, then the program needs to be translated via a compiler, assembler, interpreter, or the like, which may or may not be included within the memory 610, so as to operate properly in connection with the OS 611. Furthermore, the methods can be written as an object-oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 600 can further include a display controller 625 coupled to a display 630. In exemplary embodiments, the system 600 can further include a network interface for coupling to a network 665. The network 665 can be an IP-based network for communication between the computer 601 and any external server, client and the like via a broadband connection. The network 665 transmits and receives data between the computer 601 and external systems 30, which can be involved to perform part, or all of the steps of the methods discussed herein. In exemplary embodiments, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network W(LAN), a wireless wide area network (WWAN) a personal area network (PAN), a virtual private network (VPN), intranet or other suitable network system and includes equipment for receiving and transmitting signals.

If the computer 601 is a PC, workstation, intelligent device or the like, the software in the memory 610 may further include a basic input output system (BIOS) 622. The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software 612 stored within the memory 610, to communicate data to and from the memory 610, and to generally control operations of the computer 601 pursuant to the software. The methods described herein and the OS 611, in whole or in part, but typically the latter, are read by the processor 605, possibly buffered within the processor 605, and then executed.

When the systems and methods described herein are implemented in software 612, as is shown in FIG. 6, the methods can be stored on any computer readable medium, such as storage 620, for use by or in connection with any computer related system or method. The storage 620 may comprise a disk storage such as HDD storage.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for pre-processing a graph comprising:
    obtaining a graph comprising nodes representing entities and edges representing relationships between entities in accordance with one or more domains;
    for each edge in the graph, determining whether a data quality problem associated with a specific domain of the one or more domains exists between one or more attributes of the edge and one or more attributes of the node connected to the edge, wherein the determining is based on whether the one or more edge attributes and the one or more node attributes fulfill a set of ontology rules descriptive of an ontology of the specific domain;
    pre-processing the graph by assigning a weight to each of the nodes and each of the edges in the graph based on the determined data quality problems, the weight of each node or edge indicating whether there is a domain specific data quality problem with one or more attributes of that node or edge;

processing requests according to the assigned weights in the pre-processed graph to reduce an impact of the determined data quality problems;

receiving a request from a database matching engine, the request indicating the specific domain; and in response to receiving the request, performing the pre-processing, and integrating the pre-processed graph in the database matching engine; and utilizing the pre-processed graph as a basis for a matching decision.

2. The computer implemented method of claim 1, further comprising:

performing the pre-processing of another graph resulting in another weighted graph; and matching the two weighted graphs using the weights.

3. The computer implemented method of claim 1, wherein the set of ontology rules are automatically determined or user defined.

4. The computer implemented method of claim 1, wherein the set of ontology rules are derived from a given dataset representing the specific domain, based on determining common or uncommon edges to nodes of another domain, wherein the uncommon edges are assigned higher weights.

5. The computer implemented method of claim 1, further comprising:

removing nodes or edges having weights that fulfil a predefined filtering condition; and providing the resulting graph.

6. The computer implemented method of claim 1, wherein the weights indicate a reliability of the nodes and optionally edges for being used as a basis for a matching decision by a matching program.

7. The computer-implemented method of claim 1, further comprising:

removing a node or edge based on the assigned weighted value.

8. The computer-implemented method of claim 1, further comprising:

in response to determining that the edge points to a node of interest, increasing the weight of the edge.

9. The computer-implemented method of claim 1, further comprising:

deriving the set of ontology rules from a given sample dataset representing the specific domain; and determining uncommon edges from one domain to nodes of another domain that indicate high similarity when comparing nodes; and assigning uncommon edges higher weighted values to reflect higher similarity.

10. The computer-implemented method of claim 1, further comprising:

storing the pre-processed graph based on the assigned weights.

11. A computer program product for pre-processing a graph comprising:

one or more computer readable storage media and program instructions stored on the one or more computer readable storage media, the program instructions comprising:

program instructions to obtain a graph comprising nodes representing entities and edges representing relationships between entities in accordance with one or more domains;

for each edge in the graph, program instructions to determine whether a data quality problem associated with a specific domain of the one or more domains exists between one or more attributes of the edge and one or more attributes of the node connected to the edge, wherein the determining is based on whether the one or more edge attributes and the one or more node attributes fulfill a set of ontology rules descriptive of an ontology of the specific domain;

program instructions to pre-process the graph by assigning a weight to each of the nodes and each of the edges in the graph based on the determined data quality problems, the weight of each node or edge indicating whether there is a domain specific data quality problem with one or more attributes of that node or edge;

program instructions to process requests according to the assigned weights in the pre-processed graph to reduce an impact of the determined data quality problems;

program instructions to receive a request from a database matching engine, the request indicating the specific domain; and program instructions to, in response to receiving the request, perform the pre-processing, and integrating the pre-processed graph in the database matching engine; and program instructions to utilize the pre-processed graph as a basis for a matching decision.

12. A computer system for pre-processing a graph comprising:

one or more computer processors;

one or more computer readable storage media; and program instructions stored on the one or more computer readable storage media for execution by at least one of the one or more computer processors, the program instructions comprising:

program instructions to obtain a graph comprising nodes representing entities and edges representing relationships between entities in accordance with one or more domains;

for each edge in the graph, program instructions to determine whether a data quality problem associated with a specific domain of the one or more domains exists between one or more attributes of the edge and one or more attributes of the node connected to the edge, wherein the determining is based on whether the one or more edge attributes and the one or more node attributes fulfill a set of ontology rules descriptive of an ontology of the specific domain;

program instructions to pre-process the graph by assigning a weight to each of the nodes and each of the edges in the graph based on the determined data quality problems, the weight of each node or edge indicating whether there is a domain specific data quality problem with one or more attributes of that node or edge;

program instructions to process requests according to the assigned weights in the pre-processed graph to reduce an impact of the determined data quality problems;

program instructions to receive a request from a database matching engine, the request indicating the specific domain; and program instructions to, in response to receiving the request, perform the pre-processing, and integrating the pre-processed graph in the database matching engine; and program instructions to utilize the pre-processed graph as a basis for a matching decision.

\* \* \* \* \*